United States Patent [19]

Shaw

[11] 3,926,041

[45] Dec. 16, 1975

[54] PORTABLE HARDNESS INSPECTION TOOL

[75] Inventor: Robert B. Shaw, Houston, Tex.

[73] Assignee: Shell Oil Company, Houston, Tex.

[22] Filed: Dec. 20, 1972

[21] Appl. No.: 317,023

Related U.S. Application Data

[63] Continuation-in-part of Ser. No. 221,224, Jan. 27, 1972, abandoned.

[52] U.S. Cl. .................................... 73/85
[51] Int. Cl.² .......................................... G01N 3/42
[58] Field of Search .............. 73/81, 82, 85; 30/358, 30/366, 367; 227/54, 61

[56] References Cited
UNITED STATES PATENTS

| | | | |
|---|---|---|---|
| 609,479 | 8/1898 | Thompson | 227/55 |
| 638,815 | 12/1899 | Shepard | 227/54 |
| 2,740,308 | 4/1956 | Blanchard | 408/75 X |

*Primary Examiner*—Jerry W. Myracle

[57] ABSTRACT

A portable inspection hardness tool has a cylindrically shaped indenter which has a conically shaped tip extending a fixed distance beyond a stop. The indenter has a known hardness and by driving the indenter against the surface of a test piece until the stop contacts the test piece the hardness of the test piece may be determined by measuring the amount the conical tip has been deformed.

10 Claims, 8 Drawing Figures

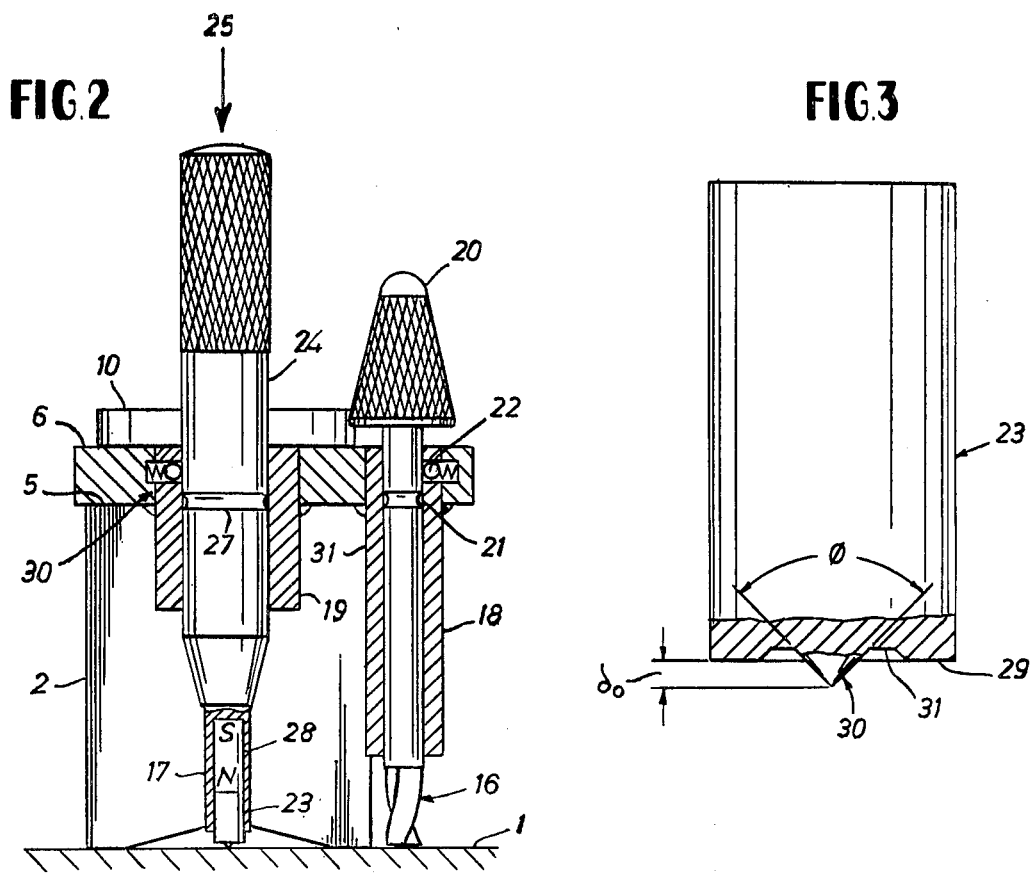
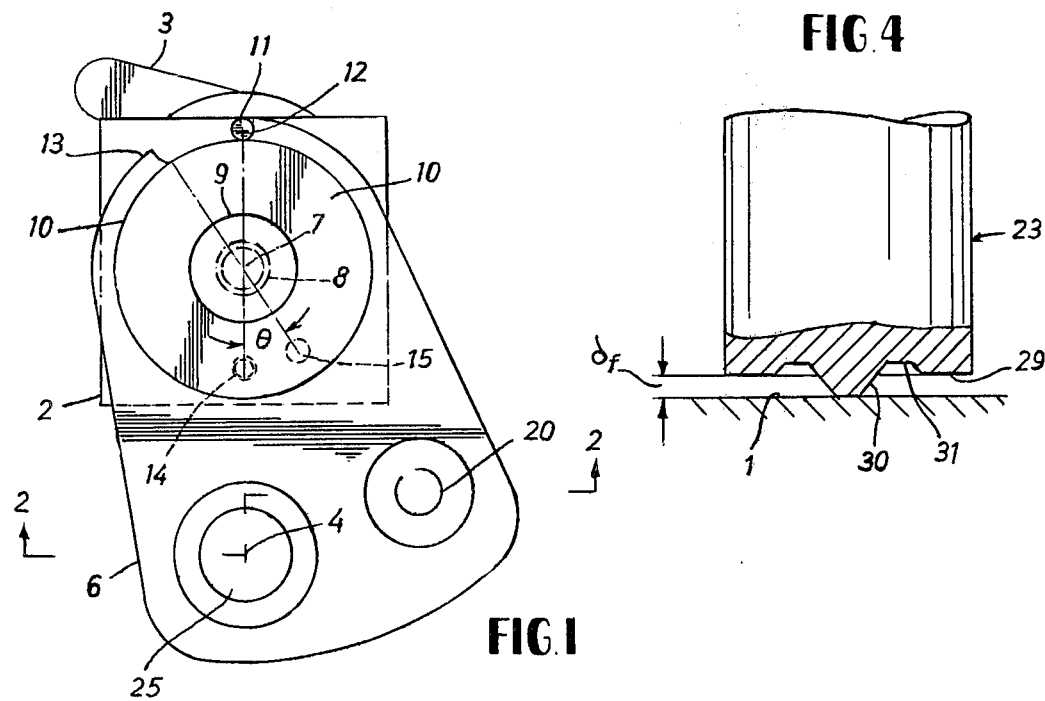

PORTABLE HARDNESS INSPECTION TOOL

CROSS-REFERENCE TO RELATED APPLICATION

This application is a continuation-in-part of application Ser. No. 221,224, filed on Jan. 27, 1972, now abandoned.

BACKGROUND OF THE INVENTION

The invention relates to a method and apparatus for measuring the hardness of steel piping or vessels in oil fields, refineries, chemical plants, and such other installations where accessability to the test specimen is difficult or in instances where removal of the specimen would be required to make a hardness determination.

DESCRIPTION OF THE PRIOR ART

Measurement of hardness in the field of such items as plate, pipe, and tubing present problems not encountered in the laboratory. Accurate hardness determinations require a flat smooth test surface whereas surfaces in the field are rough, usually coated with paint or scale, and deviate considerably from being flat.

Laboratory equipment, using prior art principles, makes an indentation on a test piece using an accurately controlled load and the hardness information is obtained by measurement of the size or depth of the indentation on the test piece. The indenter, or device used to impact the test piece, is made from a hard material such as steel, tungsten carbide or diamond so that the indentor remains undeformed after completion of the test.

As can be seen, prior art apparatus make a hardness determination under ideal conditions with the controlling parameter usually being the regulation of the impact force.

SUMMARY OF THE INVENTION

The present invention has solved the inherent disadvantages of prior art hardness testers through the use of a small, compact tool that is light in weight, self contained and portable.

The present invention, by using an indentor having a conical tip with the outer peripheral face acting as a stop, stores the hardness data for measurement at a later time in an office or laboratory since each indenter is expendable and used only once. By measuring the deformation of the tip and knowing the hardness of the tip, the test piece hardness is easily determined.

The present invention has the further advantage over prior art devices in that the indenter is of a known hardness, in a range approximately 20 to 50% greater than the range of hardness of the test pieces to be measured.

An even further advantage of the invention is the use of a small end milling cutter which can be rotated in an alignment bushing to produce a flat, circular, smooth test area for determination of hardness.

The invention offers the significant advantage of being able to make hardness determinations in the field of plate, pipe and tubing that are now considered inaccessible or uneconomic to test by using a fixture that can be rigidly held in place and the test performed without requiring removal of the test piece from its installed position.

According to the present invention a portable hardness inspection tool for measuring the hardness of a test piece comprises a holddown fixture, an expendable deformable indenter for impacting the test piece and impacting means carried by the holddown fixture, the impacting means carrying the indenter at its lower end, the impacting means being used to drive the indenter against the test piece with the amount of deformation of the conical tip of the indenter being a measure of the hardness of the test piece.

The present invention, by incorporating a milling cutter tool that prepares the surface so that the plane of the test area is perpendicular to the axis of rotation of the mill after machining, enables the operator to merely rotate the indexing plate thereby positioning the indenter above the surface previously machined thus maintaining the necessary perpendicularity required so that an accurate hardness test can be performed.

BRIEF DESCRIPTION OF THE DRAWING

The nature of the invention will be more fully appreciated with reference to the drawings in which:

FIG. 1 is a plan view of the portable hardness inspection tool;

FIG. 2 illustrates the portable hardness inspection tool affixed to a flat test surface and is taken along line 2—2 of FIG. 1;

FIG. 3 is a magnified cross-sectional view of one embodiment of the deformable conical indenter showing indenter conical tip, peripheral stop, and recessed area which are the primary features of the contour of the functional end of the indenter;

FIG. 4 illustrates the shape of the conical tip of the expendable indenter of FIG. 3 after impacting the test area;

DESCRIPTION OF A PREFERRED EMBODIMENT

Figure 5:
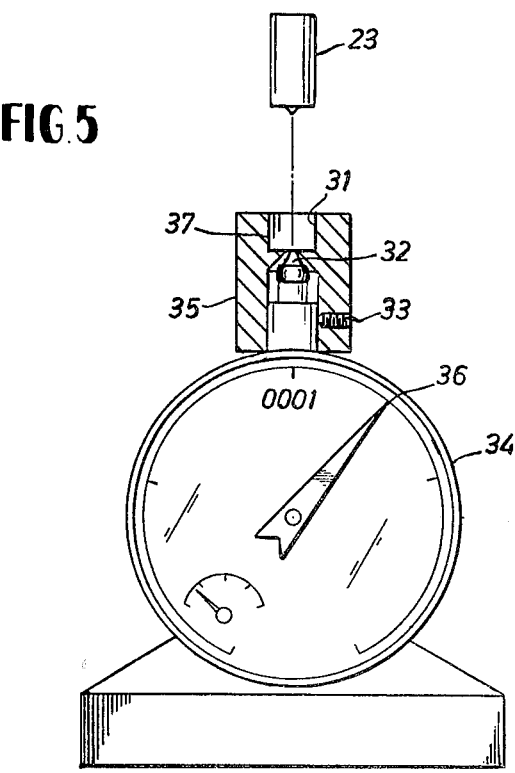
FIG. 5 shows the manner in which a dial indicator gauge is adapted to measure the final length of the blunted indenter cone tip after completion of the hardness test.

Referring to the drawing and more particularly to FIG. 1, one embodiment of the present invention is illustrated in which test piece 1 is shown as a flat iron, steel or other ferromagnetic surface, but the test piece 1 just as easily could be a vessel or tubular or any other flat or cylindrical test area. The holding fixture 2 is an "on-off" magnetic base operable by rotation of thumb lever 3, but could be operable with a push button control. The rotation of thumb lever 3 aligns the poles of a powerful permanent magnet located within the holding fixture 2, thereby supplying the required hold-down force for preventing any movement of the tool during either the preparation of a small test surface area 4 on the larger test piece surface 1, or subsequently during the operation of the tool in performing the hardness test itself. The top surface 5 of the magnetic base 2 preferably has a flat machined surface and has attached to it indexing plate 6 whose top and bottom surfaces are accurately ground parallel to one another. The indexing plate 6 is rotatable in its own plane about axis 7 determined by a cylindrical bearing surface 8 on machine screw 9 which engages a threaded hole in magnetic base 2, the machine screw 9 holding the cap plate 10 in position. The indexing plate 6 may be rotated through a limited angle θ which approximates 34° and is determined by the pin 11 and the two stops 12 and 13 on the outer periphery of the indexing plate 6. When the indexing plate 6 is in either of these two extreme positions against pin 11, one of the locating detents 14 or 15 as the case may be drops into place preventing any accidental or undesired motion of the indexing plate 6 from its fixed position. The detents 14 and 15 each consist of a spring loaded hardened steel ball carried in the cap plate 10. The ball may engage one of two shallow circular depressions in index plate 6. The indexing plate 6 supports end milling cutter tool 16 and indenting tool 17, indexing plate 6 being rotatably mounted to position either tool by manual operation directly over test surface area 4 as desired by the operator. The indexing plate 6 also carries two hardened steel precision ground bushings 18 and 19 which are installed in holes 30 and 31 respectively in indexing plate 6 such that a press fit exists between each bushing and the associated hole. The axis of each of the bushings 18 and 19 is perpendicular to the plane of the indexing plate 6 and the two axis of each bushing 18 and 19 being parallel to one another. Bushing 18 accommodates the shank of end milling cutter 16 which fits snugly in the bore of the bushing 18 but is free to rotate in the bushing 18. The top of the milling cutter 16 is provided with a cone shaped knurled knob 20 which is used to grip and rotate the cutter 16. The shank of the cutter 16 is provided with a small circular groove 21 which can be engaged by spring loaded ball detent 22, the detent 22 holding the cutting tool assembly from engaging the test piece 1 until such time as the tool 16 is lowered into position for use. The detent 22 also prevents the cutting tool assembly 16 from falling out of the bushing 18 when the hardness testing instrument is used in the up side down position. When the milling cutter tool 16 is to be used, the indexing plate 6 is rotated until stop 13 engages pin 11 and then held in place by detent 14 so that the tool is positioned directly over the area 4 which is to be subsequently machined. Machining of the area 4 is not necessary in all circumstances, particularly if the test area 4 does not have any scale, rust or other foreign material which would impair an accurate hardness determination. The tool 16 is thrust against area 4 and at the same time rotated in a clockwise direction by the operator rotating knob 20, provided tool 16 is a right hand end mill. The action of the cutter 16 removes paint or scale and mills a flat face a few thousands of an inch into the metal surface at 4. After the surface at area 4 is machined, the cutting tool 16 is raised up from surface area 4 until the detent 22 engages the groove 21 locking the cutting tool 16 in position. The indexing plate is then rotated through angle θ until stop 12 bears against pin 11, as shown in FIG. 1, aligning the longitudinal axis of bushing 19 with the center of area 4 previously prepared by tool 16. Bushing 19 carries the hardness testing tool 24, the lower end of which holds the special indenter 23 and the upper end of which consists of a self contained impacting device of standard manufacture, known as an "automatic center punch" (manufactured by Starrett Company). The automatic center punch contains a steel mass that is spring loaded, the steel mass being released to impact rod 17 by a trigger mechanism that is actuated by pushing in the direction 25 a specified distance.

In a preferred embodiment of the invention an automatic center punch would be used by any instrument capable of delivering a force to the indenter 23 could be used such as a small hammer. The force of the impact of the steel mass is communicated to the indenter 23 along the longitudinal axis of the bushing 19. After the initial push in direction 25 the ball detent 26 releases from the circular groove 27 allowing the cylindrical surface of tool 24 to slide in the bushing 19. Impacting of the indenter tip 30 against the surface 4 may be repeated by the operator of the portable hardness tester as many times as desired it only being necessary to drive the indenter tip forceably against surface 4 until the peripheral stop 29 at the end of indenter 23 comes into intimate contact with surface 4. One or two impacts is generally necessary for stop 29 to contact the surface 4. A small magnet 28 is positioned and fixed permanently in shaft 17 and the indenter 23 is held in position by attraction to one pole of the magnet 28 but the indenter 23 is removable when desired, as the outside diameter of the indenter 23 is sized such that a sliding fit between the indenter 23 and the inner bore of shaft 17 exists.

An enlarged view of one embodiment of the indenter 23 is shown in FIG. 3. The cone tip 30 has a cone angle φ which is preferably 90°. In a preferred embodiment cone tip 30 has a height such that the distance δ closely approximates 0.0125 inch. The end face 29 serves as a peripheral stop controlling the maximum distance the body of indenter 23 can move toward test piece 1 under the force of impact generated by impact of the automatic center punch and transmitted to the indenter 23 through shaft 17. The force of the impact drives peripheral stop 29 into intimate contact with test surface 4. At the same time the conical tip 30 produces an indentation in test surface 4 of test piece 1 and in producing the indentation conical tip 30 deforms and the end of conical tip 30 becomes blunted causing the original distance δ o to decrease to a smaller value $δ_f$, as shown in FIG. 4. The recess 31 of indenter 23 is a necessary part of the indenter tip shape of the embodiment shown in FIG. 3 if an indenter has a diameter of roughly .25 inch because the conical tip 30 undergoes plastic deformation upon impact with test area 4 and the recess 31 provides a space for accommodating some of the volume of conical tip 30 as deformation occurs.

Figure 7:
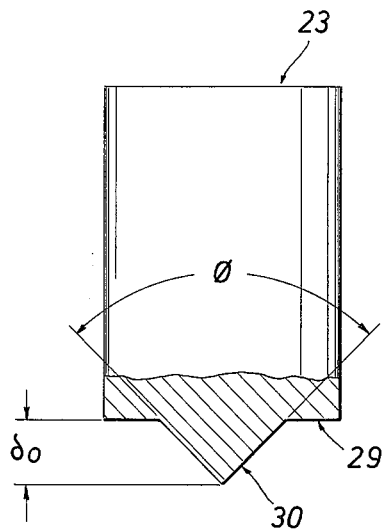
FIG. 7 illustrates an alternative embodiment of the expendable indenter of FIG. 3.
Figure 8:
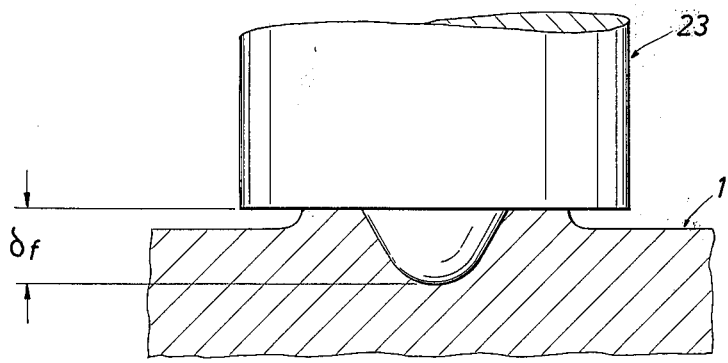
FIG. 8 shows the shape of the conical indenter of FIG. 7 after impacting the test area.

If an indenter 23 is used having a smaller diameter (on the order of .10 inch) the recess 31 is not required to accommodate some of the volume as the conical tip deforms. Using the indenter 23 shown in FIG. 7 metal is displaced upward and eventually comes into contact with the stop 29 on the indenter 23 when making a hardness determination. FIG. 8 is an illustration of this operation.

The accuracy of the deformable indenter hardness testing method of the present invention primarily depends on maintaining suitable tolerance limits on the conical tip length, δo, and the hardness of conical tip 30. By controlling these features accurate measurements of the hardness of a test piece may be determined using the method and apparatus of the present invention.

Figure 6:
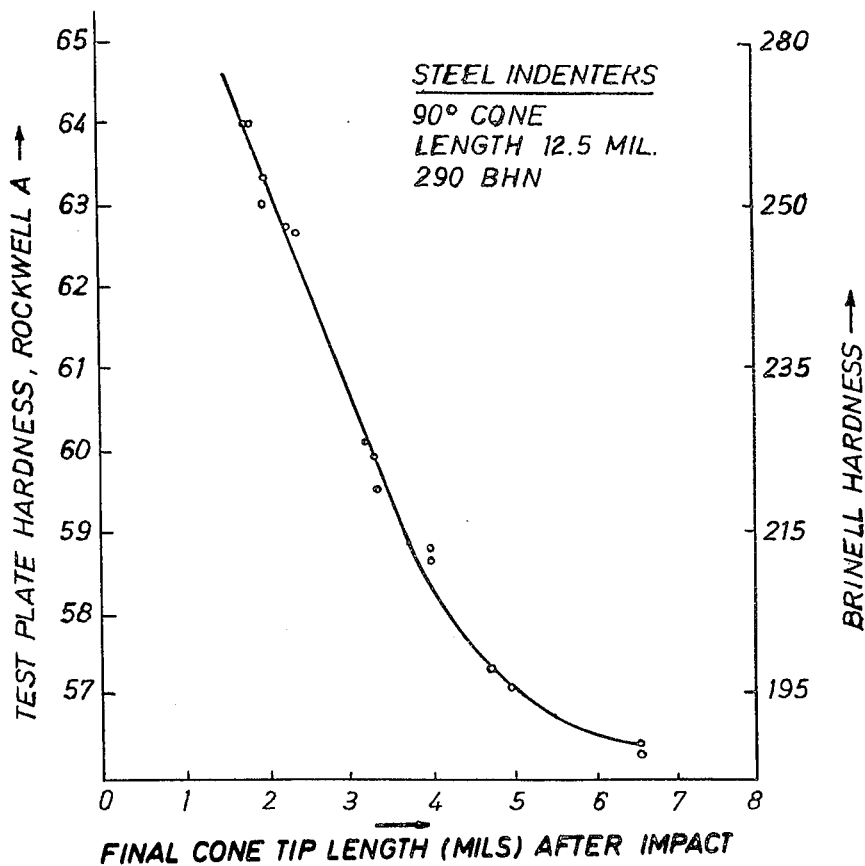
FIG. 6 illustrates a calibration curve of a steel indenter in which the final cone length after impact is related to the test plate hardness.

In FIG. 6 a calibration curve is shown for an indenter of the present invention, the calibration illustrating the relationship between the final cone tip length, $δ_f$, as related to the hardness of the test piece. A curve of this type would be required for each range of hardness investigated since the present invention uses an indenter having a hardness approximately 20 to 50% greater than the test piece.

After the indenter 23 has been forced against surface 1 at area 4 and the peripheral stop has contacted surface 1, the hardness of the test piece 1 at position 4 can be determined by measurement of the final length $\delta_f$ of conical tip 30. The measurement is performed quickly using the dial indicator gauge 34 illustrated in FIG. 4. A metal adapter 35 as shown in FIG. 5 is attached to the precision dial indicator gauge 34 which is of standard manufacture and preferably has a least division on the dial of 0.0001 inch. An indenter 23 as shown in FIG. 5 is ready to be inserted in cylindrical hole 31 and pressed down with a force sufficient to activate dial gauge 34 so that the blunted conical tip 30 pushes against dial gauge tip 32 directly measuring final tip length $\delta_f$. The dial indicator assembly alternately could have a scale 36 registering in the desired hardness scale. The needle 36 is movable in relation to the movement of plunger 32. The block 35 has a flat surface 37 which butts against the stops 29 of the indenter 23. The dial indicator assembly is calibrated by inserting in hole 31 a blank indenter 23, the end face of which is perfectly flat and the needle 31 would be adjusted to register a zero reading in terms of actual deflection or alternately would register an infinite hardness in terms of a dial calibrated in hardness units.

There are obvious alternative embodiments of this invention but only a method and apparatus has been disclosed of determining hardness of a test piece through the use of an expendable indenter from which the hardness information is obtained. Further, there are obvious alternative methods of applying a force to push the indenter 23 into the test surface. There are also obvious alternate ways of designing an indexing plate, e.g., a sliding motion rather than a rotating motion. An obvious application of a sliding indexing motion would be in the design of an instrument for hardness measurement of corner fillet welds located where one plate is welded perpendicular to another plate or where a pipe joins a flange.

I claim as my invention:

1. An apparatus for measuring the hardness of a test piece, said apparatus comprising:
   a holddown fixture;
   machining means carried by said holddown fixture, said machining means being rotatably mounted;
   impacting means carried by said holddown fixture; and
   an expendable indenter disposed at one end of said impacting means, said indenter having a conical tip at one end, said tip having a known length that extends beyond a peripheral stop disposed at the same end of the indenter as said tip whereby when the indenter is driven against said test piece until said stop contacts said test piece the deformation of said conical tip is a direct measurement of the hardness of said test piece.

2. The apparatus of claim 1 wherein the holddown fixture is a magnetic V-block.

3. The apparatus of claim 1 wherein said machining means is a multiple fluted end mill.

4. The apparatus of claim 1 wherein the hardness of said indenter is approximately 20% more than a test piece to be tested.

5. The apparatus of claim 1 wherein said conical tip extends beyond said peripheral stop approximately .0125 inches.

6. The apparatus of claim 1 wherein said impacting means is an automatic center punch.

7. The apparatus of claim 1 further including positioning means whereby said indenter occupies the same position as said machining means subsequent to machining said test piece in preparation for performing a hardness test.

8. The apparatus of claim 1 further including means for measuring the deformation of the conical tip of said indenter and converting said measurements into an indication of the hardness of said test piece.

9. A method of measuring the hardness of a test piece, said method comprising the steps of:
   positioning a fixture above the test piece;
   locking said fixture rigidly in place;
   machining a small test area on same test piece using suitable means;
   positioning an indenter above the machined test area of said test piece, said indenter further having a known hardness;
   driving the indenter into said test area a known distance;
   removing said indenter from said fixture; and
   measuring the amount of deformation of said indenter, said deformation being a direct measure of the hardness of said test piece.

10. A method of measuring the hardness of a test piece comprising the steps of:
    positioning an expendable indenter above the test piece;
    driving the indenter against the test piece a known distance; and
    measuring the amount of deformation of the indenter, the amount of deformation being a direct measure of the hardness of the test piece.

* * * * *